United States Patent [19]
Takehira et al.

[11] Patent Number: 5,743,371
[45] Date of Patent: Apr. 28, 1998

[54] CLUTCH DISC ASSEMBLY

[75] Inventors: Yasushi Takehira; Shinichi Noda, both of Neyagawa, Japan

[73] Assignee: Kabushiki Kaisha Daikin Seisakusho, Osaka, Japan

[21] Appl. No.: 745,750

[22] Filed: Nov. 8, 1996

Related U.S. Application Data

[62] Division of Ser. No. 144,682, Oct. 28, 1993, Pat. No. 5,590,752.

[30] Foreign Application Priority Data

Oct. 30, 1992 [JP] Japan ................................. 4-075538

[51] Int. Cl.⁶ ........................... F16D 3/80; F16D 13/64
[52] U.S. Cl. .................. 192/208; 192/213.21; 464/24; 464/68
[58] Field of Search .......................... 192/208, 213.2, 192/213.21, 213.22; 464/24, 66, 68

[56] References Cited

U.S. PATENT DOCUMENTS

| | | | |
|---|---|---|---|
| 4,351,167 | 9/1982 | Hanke et al. | 464/24 |
| 5,017,179 | 5/1991 | Hanke et al. | 464/24 |
| 5,097,722 | 3/1992 | Fukushima | 192/208 X |
| 5,180,044 | 1/1993 | Fukushima et al. | 192/208 |
| 5,194,045 | 3/1993 | Hanke | 464/24 |
| 5,249,659 | 10/1993 | Fukushima | 192/208 X |
| 5,353,664 | 10/1994 | Yamamoto | 192/208 X |

*Primary Examiner*—Richard M. Lorence
*Attorney, Agent, or Firm*—Knobbe, Martens Olson & Bear, LLP

[57] ABSTRACT

A clutch disc assembly interposed between an input side rotary member and an output side member has a hub, disc-like plates, a friction member, an elastic member and a viscous damper mechanism. The hub is connectable for co-rotation with the output side member. The hub has a flange on its outer circumference. The disc-like plates are rotatably mounted on the hub. The friction member is connected to said disc-like plates, for frictional engagement with the input side rotary member. The elastic member is for elastically connecting the flange and the disc-like plates whereby the flange and the disc-like plates are rotatable with respect to each other. The viscous damper mechanism includes a fluid medium, for displacing the fluid medium through restrictions in response to angular movements of the disc-like plates and the flange with respect to each other.

10 Claims, 10 Drawing Sheets

CLUTCH DISC ASSEMBLY

This is a divisional of U.S. patent application Ser. No. 08/144,682 filed Oct. 28, 1993 now U.S. Pat. No. 5,590,752.

BACKGROUND OF THE INVENTION

The present invention relates to a clutch disc assembly used in a vehicle.

The clutch disc assembly is interposed between an automotive engine and an automotive transmission. The clutch disc assembly is used to connect or disconnect the power transmission and also to dampen torsional vibration as a damper. In general, the clutch disc assembly includes a hub connectable to an input shaft of the transmission and having a flange on its circumference, a pair of disc-like plates rotatably mounted on the hub and disposed on both sides of the flange, friction members fixed to the disc-like plates for frictional engagement with an input side rotary member such as the engine flywheel, coil springs used as elastic members for elastically coupling the disc-like plates and the flange in the circumferential direction, and a frictional resistance generation mechanism interposed between the disc-like plates and the flange.

In this clutch disc assembly, when torsional vibration is transmitted from the flywheel thereto, the coil springs are repeatedly compressed and expanded so that the pair of disc-like plates and the hub are twisted relative to each other. During this angular movement of the disc-like plates and the flange relative to each other, frictional resistance is generated on the basis of the frictional resistance mechanism, to thereby dampen energy of the torsional vibration.

In such a clutch disc assembly, in order to effectively dampen the torsional vibration over a wide operational range, it is preferable that magnitude of the frictional resistance be varied depending upon the kinds of the torsional vibration. There are two kinds of torsional vibrations, for example, torsional vibration having small angular displacement caused by the combustion fluctuation of the engine, and low-frequency torsional vibration having large angular displacement which is caused when a driver suddenly depresses or loosens an accelerator pedal. In order to dampen the torsional vibration having small angular displacement, the clutch disc assembly has to have low rigidity/small resistance characteristics as a damper. In order to dampen the low-frequency torsional vibration having large angular displacement, the clutch disc assembly has to have a high rigidity/large resistance characteristics as a damper.

In the conventional clutch disc assembly, the two different torsional characteristics may be realized by using a structure where the two different frictional forces are generated depending on the different kinds of the torsional vibration. However, with the frictional resistance by the sliding movement of the frictional member, it would be impossible to increase the second stage frictional force to a satisfactory level. It would be therefore impossible to sufficiently dampen the low-frequency vibration.

Recently, automotive vehicles have been widely used on highways. Thus, frequency of the engagement/disengagement of a clutch has been decreasing because of more highway use. For this reason, when a service life of a clutch disc assembly as a whole is contemplated, a problem of wear of friction facings has become less important. Then, a service life of an elastic member support portion of the pair of disc-like plates is being raised. In other words, when the torsional vibration is generated, the elastic member is repeatedly expanded and contracted to thereby wear the support portion of the disc-like plates.

SUMMARY OF THE INVENTION

It is an object of the present invention to increase the resistance in order to dampen the low-frequency vibration.

It is another object of the present invention is to decrease the wear of the disc-like plates due to the expansion/contraction of the elastic members.

A clutch disc assembly according to an aspect of the present invention is interposed between an input side rotary member and an output side member; and comprises a friction member, disc-like plates, a hub, and a viscous damper mechanism.

The hub is connectable for co-rotation with said output side member and has a flange on its outer circumference. The disc-like plates are rotatably mounted on the hub. The fiction member is connected to the disc-like plates for frictional engagement with the input side rotary member. The elastic member is for elastically connecting the flange and the disc-like plates whereby the flange and the disc-like plates are rotatable with respect to each other. The viscous damper mechanism includes a supply of viscous fluid medium and is for displacing the fluid medium through restrictions in response to angular movements of the disc-like plates and the flange with respect to each other.

In this clutch disc assembly, when the friction member is frictionally engaged with the input side rotary member, the torque transmitted from the input side rotary member is transmitted from the friction member and the disc-like plates to the flange of the hub through the elastic member. When the torsional vibration is input from the input side rotary member, the elastic member is repeatedly expanded/contracted between the disc-like plate and the flange. At this time, the torsional vibration is dampened by the viscous resistance generated by the viscous damper mechanism.

The viscous damper mechanism generates the viscous resistance by utilizing the fluid medium. Thus, it is possible to increase the resistance to dampen the low-frequency torsional vibration.

In the foregoing operation, if the disc-like plates and the hub form a fluid chamber containing fluid medium and the elastic member is disposed therein, the wear of the disc-like plates is prevented by the fluid medium to thereby prolong the service life of the clutch disc assembly.

The foregoing and other objects, aspects and advantages of the present invention will become more apparent from the following detailed description when taken in conjunction with the accompanying drawings.

DESCRIPTION OF THE PREFERRED EMBODIMENTS

FIRST EMBODIMENT

Figure 1:
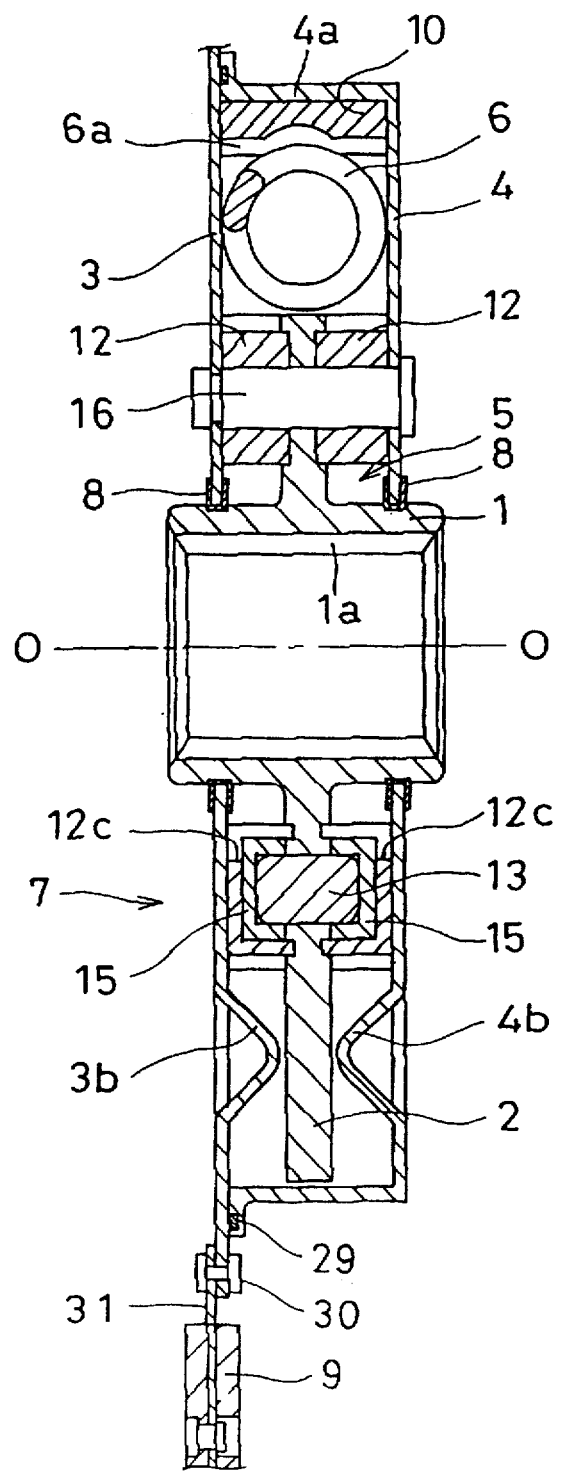
FIG. 1 is a longitudinal sectional view showing a clutch disc assembly in accordance with the first embodiment of the invention.
Figure 2:
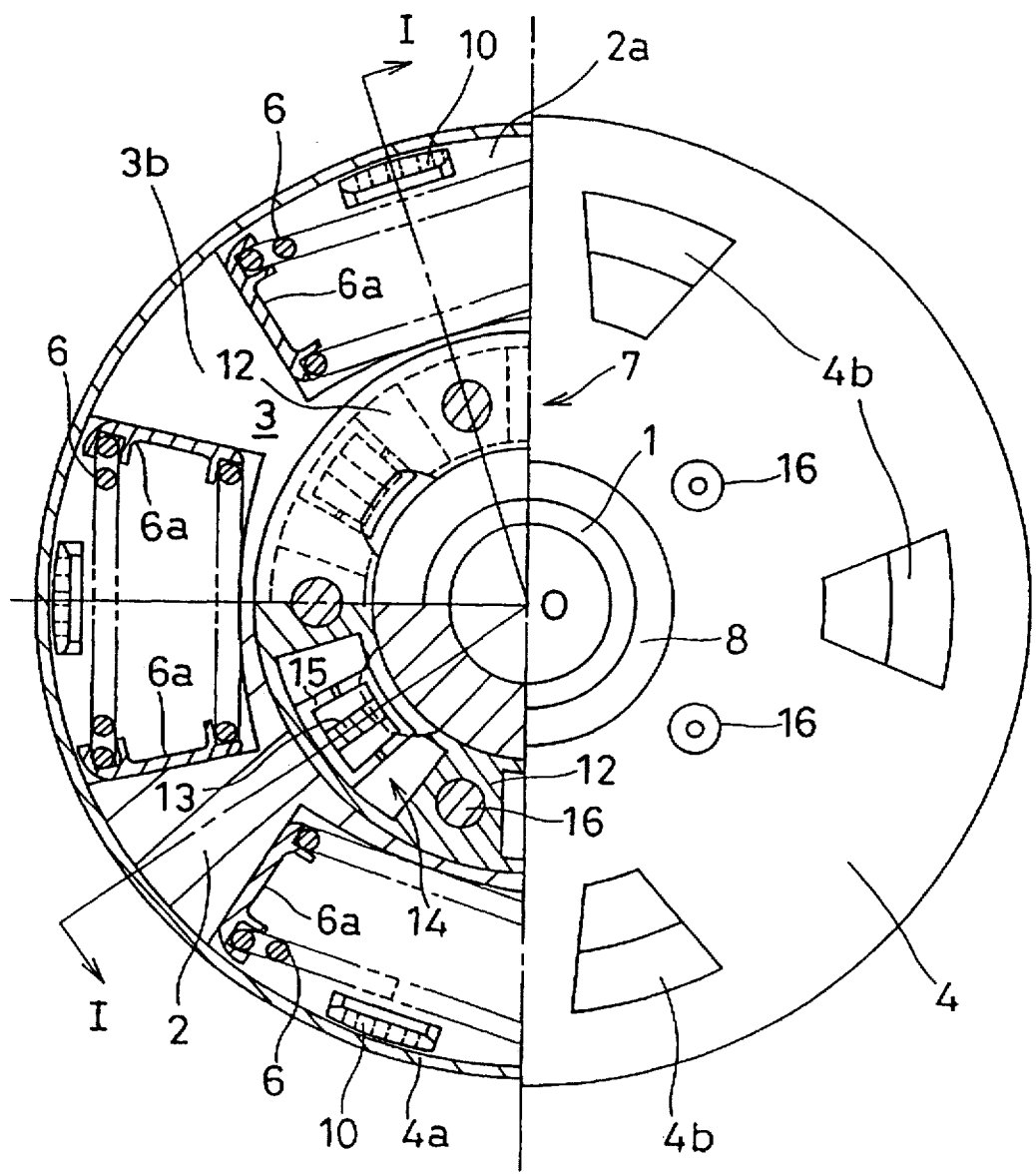
FIG. 2 is a partially fragmentary plan view showing the clutch disc assembly.

FIGS. 1 and 2 show a clutch disc assembly in accordance with first embodiment of the invention. The line 0—0 represents a rotary centerline of the clutch disc assembly.

In the figures, the clutch disc assembly is composed mainly of a hub having a flange on its outer circumference, a clutch plate 3 and a retaining plate 4 which are disposed on both sides of the flange 2 and rotatably fitted on the hub 1 from the outer circumferential sides, a plurality of coil springs 6 for elastically coupling both plates 3 and 4 with the flange 2 in the circumferential direction, and a viscous damper mechanism 7 disposed within a fluid chamber 5 formed by both the plates 3 and 4 and the hub 1, which generates viscous resistance during the relative rotation between both the plates(3,4) and the flange 2.

The hub 1 is, at its central portion, formed with spline teeth 1a for engagement with spline portions on an outer circumference of an input shaft (output side member) of the transmission (not shown).

The fluid chamber 5 is filled with a fluid such as oil. The outer circumferential wall of the fluid chamber 5 is formed by an outer cylindrical wall 4a extending in the axial direction from the retaining plate 4. An O-ring 29 is disposed between an edge flange of the outer circumferential cylindrical wall 4a and the clutch plate 3 to seal the outer circumferential portion of the fluid chamber 5. There are also a plurality of cushioning plates 31 fixed to the outer circumferential portion of the clutch plate 3 by rivets 30. Frictional facings 9 are fixed to both sides of the cushioning plates 31 to be pressed against a flywheel (not shown). Sealants 8 are attached between the inner circumferential portions of the clutch plate 3 and the retaining plate 4, and the outer circumferential surfaces of the hub 1, respectively, to seal the inner circumferential portion of the fluid chamber 5.

As shown in FIG. 2, sector-like cutaways 2a opening radially outwardly are formed in the outer circumferential portion of the flange 2. Coil springs 6 are received into the spring seats 6a provided at both ends of each cutaway 2a. The coil spring 6 is arranged within the cutaway 2a such that intervals between the adjacent coil turns on the radially outward side are larger than those on the radially inward side. Support portions 3b and 4b are each tapered radially inward, sector-like, and aligned with the intervals between the cutaways 2a. These support portions 3b and 4b are in contact with the spring seats 6a of the coil springs 6.

Figure 3:
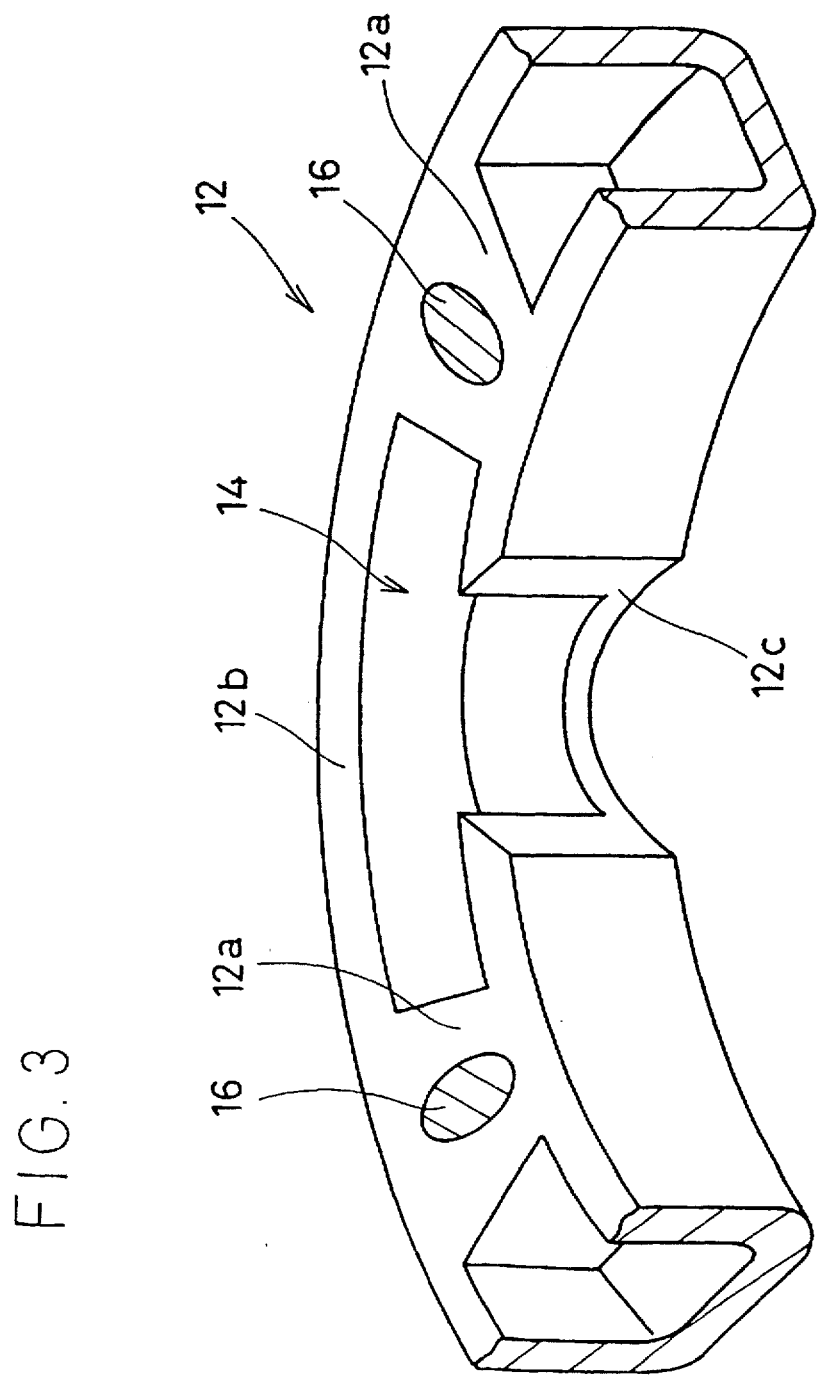
FIG. 3 is a partial perspective view showing an annular member.

The viscous damper mechanism 7 is disposed radially inwardly from the coil springs 6. The viscous damper mechanism 7 is composed mainly of a pair of annular members 12, rectangular plate-like fixed members 13 fixed to the flange 2, and a pair of sliders 15 disposed within arcuate chambers 14 (see FIGS. 2 and 3) formed in the annular members 12. Each of the pair of annular members 12, as shown in FIG. 3, has an opening in the inward axial directions with respect to the whole device (upwardly in FIG. 3). The plurality of arcuate chambers 14 are formed by a plurality of partition portions 12a which are formed at a constant interval in the circumferential direction. A cutaway 12c is formed in an inner circumferential wall at the central portion of each chamber 14. The cutaway 12c extends into a part of a side wall of the chamber 14. The pair of annular members 12 are fixed to the clutch plate 3 and the retaining plate 4 by stud pins 16 at the partitioning portions 12a. The stud pins 16 are inserted into long holes(not shown) formed in the circumferential direction of the flange 2. The long holes formed in the flange 2 ensures that the chambers 14 facing each other through the flange 2 communicate with each other.

Figure 4:
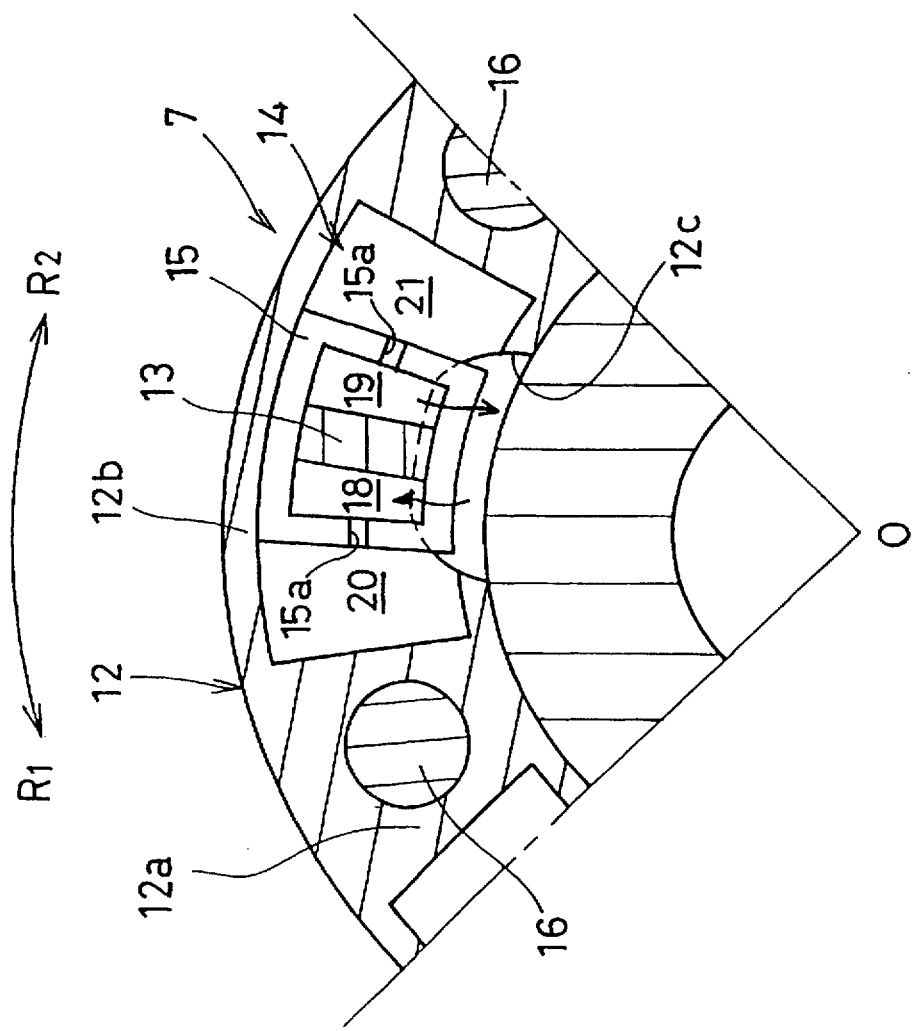
FIG. 4 is an enlarged view of FIG. 2 and a view showing one operational condition of the viscous damper mechanism.

The fixed members 13 extend in both axial directions of the flange 2 and are disposed in the respective arcuate chambers 14. The sliders 15 which are in the form of boxes are disposed at both ends of the fixed members 13 in the axial direction. Inner and outer walls of the sliders 15 have substantially the same shape of the outer and inner walls of the arcuate chambers 14 within which the sliders 15 lie so that they may be movable in the circumferential direction within the arcuate chambers 14 and divides the arcuate chambers into two large partition chambers 20 and 21, as shown in FIG. 4. Inside of the sliders 15 are divided into small partition chambers 18 and 19 by the fixed members 13. End walls of the slider 15 keep away from both the circumferential sides of the fixed member 13 with a given displacement angle. Holes 15a are formed in both end walls of the sliders 15 in the circumferential direction. Thus, the large partition chambers 20 and the small partition chambers 18 are in communication with each other, and the small partition chambers 19 and the large partition chambers 21 are in communication with each other.

The cutaways 12c of the annular members 12 substantially correspond to a neutral position of the sliders 15. In the neutral position, the cutaways 12c are in communication with all the small partition chambers 18 and 19, and the large partition chambers 20 and the 21.

The operation of the clutch disc assembly and characteristics of the operation will be described.

When the friction facings 9 are depressed against, for example, the engine flywheel, the torque of the engine flywheel is input to the clutch plate 3 and the retaining plate 4. The torque is transmitted to the flange 2 of the hub 1 through the coil springs 6, and further transmitted to the input shaft (not shown).

The change in torsional rigidity of the coil springs 6 will be explained. Assume that the hub 1 is fixed to a base (not shown) and the clutch plate 3 and the retaining plate 4 is twisted relative to the hub 1. When the plates 3 and 4 start the torsional operation relative to the flange 2 (hub 1), mainly, the outer circumferential side of the coil springs 6 will flex to obtain a low rigidity characteristics. When the compression of the coil springs 6 is developed, the inner circumferential side of the coil springs 6 starts to be compressed to obtain a high rigidity characteristics. After the stud pins 16 have been brought into contact with ends of the long holes of the flange 2, the angular movement of the clutch plate 3 and the retaining plate 4 to the flange 2 is finished.

During the above-mentioned torsional operation, the viscous resistance is generated by the viscous damper mechanism 7. Assume that the clutch plate 3 and the retaining plate 4 are twisted, for example, in direction $R_1$, from the neutral position shown in FIG. 4. In this case, the annular members 12 and the sliders 15 are rotated together in the rotational direction $R_1$. Thus, the small partition chambers 19 in the sliders 15 are compressed to be small in volume, and at the same time, the small partition chambers 18 are expanded to be large in volume. At this time, the fluid will flow radially out from the small partition chambers 19 through the cutaways 12c of the annular members 12 and into the small partition chambers 18 through the cutaways 12c, wherein said cutaways 12c opening to the small partition chambers 19 functions as a first choke portion. Since the cross-sectional area of the flow paths of the cutaways 12c is formed to be large, the viscous resistance is small. Accordingly, in this case, the small viscous resistance is generated.

Figure 5:
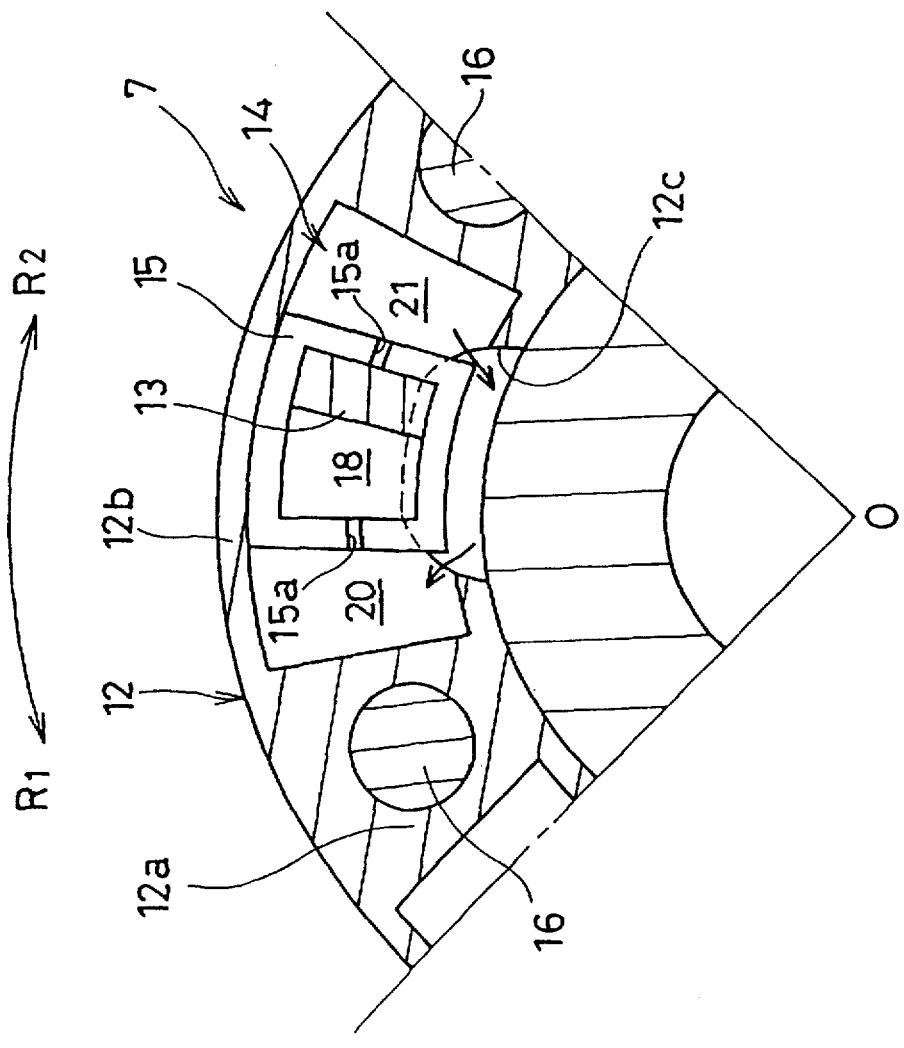
FIG. 5 is a view showing another operational condition showing the viscous damper mechanism.
Figure 6:
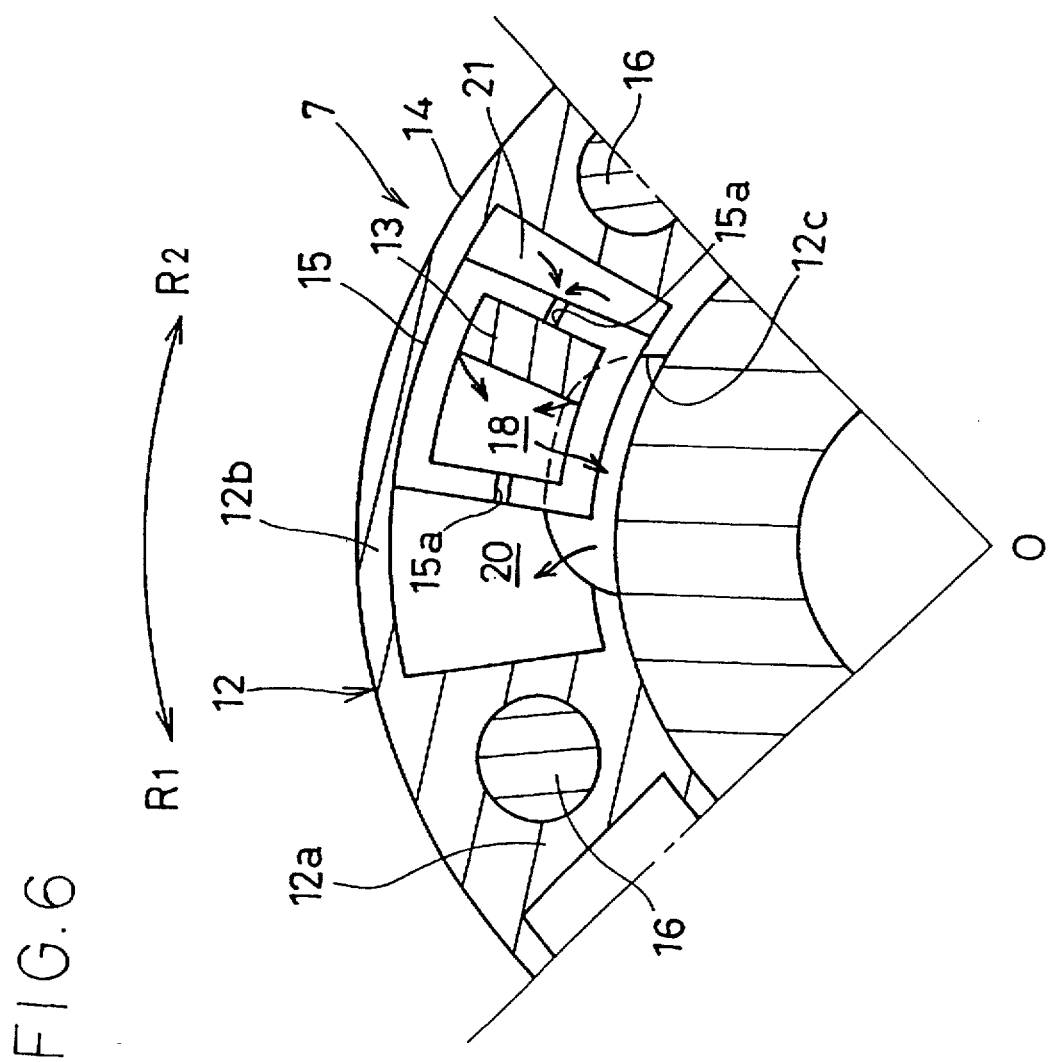
FIG. 6 is a view showing still another operational condition showing the viscous damper mechanism.

After the torsional angle is increased so that the circumferential walls on the rear side of the sliders 15 in the circumferential direction are brought Into contact with the fixed member 13 (FIG. 5), the large partition chambers 21 is contracted to be small in volume, and the large partition chambers 20 is expanded to be large in volume. At this time, at first, the fluid will flow from the large partition chambers 21 through the cutaways 12c. When the torsional operation is advanced, as shown in FIG. 6, the communication between the second large partition chambers 21 and the cutaways 12c is interrupted by the sliders 15. As a result, the fluid contained in the large partition chambers 21 will not flow through the cutaways 12c so that the fluid contained in the large partition chambers 21 will be pressured to flow through the holes 15a and further to seep inbetween intimate interfaces between the sliders 15 and the fixed members 13, wherein the intimate interfaces function as second choke portions. Since the flow path area of the intimate interfaces as the second choke portion is small, the viscous resistance is large.

In the case where the clutch plate 3 and the retaining plate 4 are returned on the side $R_2$ after they have been twisted on the side $R_1$, first of all, the rear ends of the sliders 15 in the circumferential direction are separated away from the fixed members 13, and the fluid will flow from the cutaways 12c into the small partition chambers 19. When the sliders 15 are kept on returning to the side R2, the fluid will flow from the cutaways 12c into the large partition chambers 21. Consequently, when the components are returned once they have been twisted, the fluid quickly returns back to the partition chambers where the fluid has been compressed after angular movements. Accordingly, the return operation of the twist operation may be smoothly and quickly attained. Incidentally, when the rear ends of the sliders 15 separate from the fixed members 13, all the partition chambers are in communication with the cutaways 12c so that a small viscous resistance is generated.

Assume that torsional vibration having a small angular displacement is transmitted to the viscous damper mechanism 7 due to, for example, combustion fluctuations of the engine under the condition that the clutch plate 3 and the retaining plate 4 are in the neutral position as shown in FIG. 4. In this case, the annular member 12 and the slider 15 move relative to the flange 2 in a small-angle range, whereby the fluid goes in and out from the small chambers 18 and 19 through the first choke portion formed by the cutaways 12c. Therefore, small viscous resistance effectively dampens the torsional vibration having a small angular displacement.

Further assume that the torsional vibration having a small angular displacement is transmitted to the viscous damper mechanism 7 under the condition that the clutch plate 3 and the retaining plate 4 are twisted relative to the flange 2 through a certain angle. In this case, the annular member 12 and the sliders 15 move relative to the flange 2 in a small-angle range where the first and second small partition chambers 18 and 19 are in fluid communication with the cutaways 12c, so that it is possible to obtain a small viscous resistance. Namely, the time when the viscous resistance is changed is not determined by the absolute twist angle of the clutch plate 3 and the retaining plate 4 relative to the flange 2 but by the positional relation between the sliders 15 and the fixed members 13.

Assume that the low-frequency torsional vibration is input to the viscous damper mechanism 7 because the driver suddenly depresses or loosen the accelerator pedal. Since the low-frequency torsional vibration has a large angular displacement, the annular member 12 moves relative to the flange 2 in a large angle range where the fluid in the large partition chambers 20 and 21 mainly flows into the small partition chambers 18 and 19 through the holes 15 and the intimate interfaces between the fixed member 13 and the slider 15, which generates large viscous resistance.

In this case, since the viscosity of fluid is utilized, it is possible to generate a large viscous resistance in comparison with the frictional resistance by the conventional friction member. Accordingly, it is possible to effectively dampen the low-frequency torsional vibration.

As mentioned before, the viscous damper mechanism 7 can effectively dampen two different kinds of torsional vibrations by generating different magnitudes of the viscous resistance. Also, by the utilization of the viscosity, the change of the torsional rigidity may be smooth.

The viscous damper mechanism 7 is disposed radially inwardly of the coil spring 6, and hence it does not suffer the enlargement of the clutch disc assembly as a whole.

The coil springs 6 are lubricated within the fluid chambers 5. Therefore, even if the coil springs 6 are repeatedly expanded and compressed and might be brought into contact with the support portions 3b and 4b of the clutch plate 3 and the retaining plate 4, frictional wear and damage at the support portions 3b and 4b would hardly occur. As a result, the service life of the clutch disc assembly as a whole may be improved.

SECOND EMBODIMENT

Figure 7:
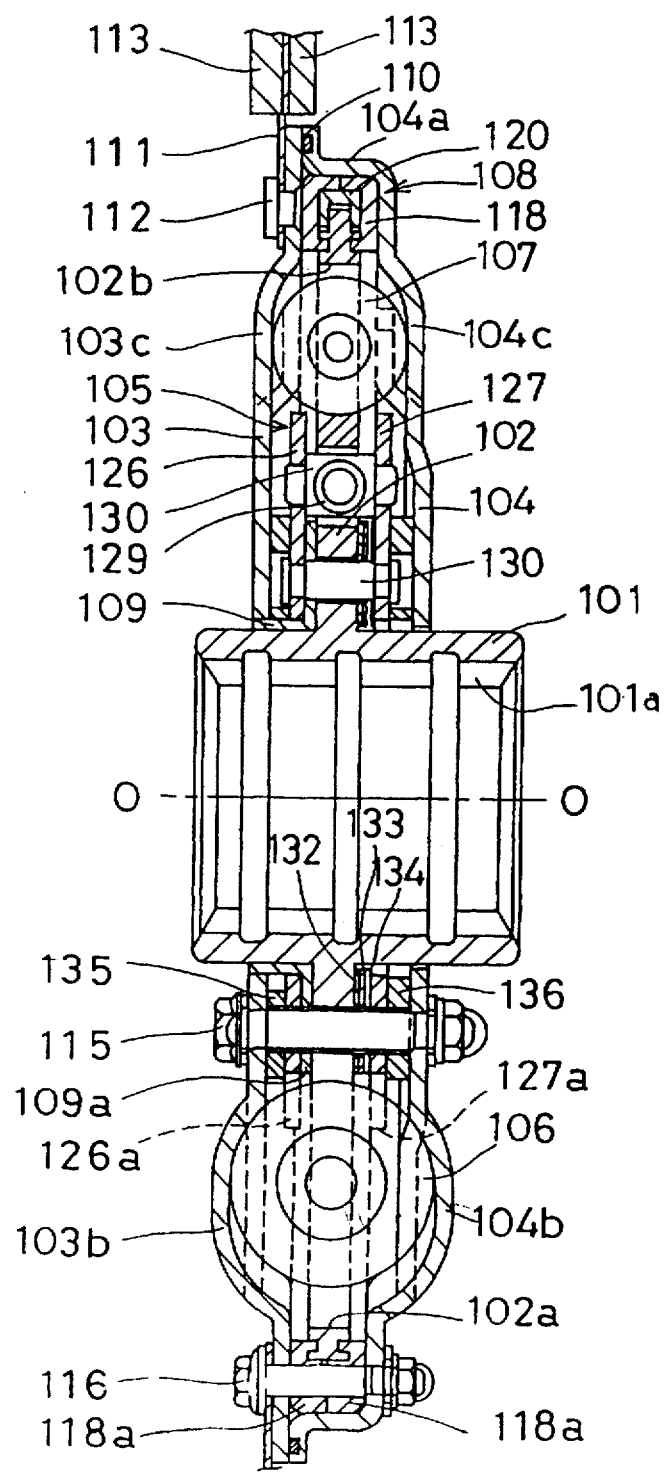
FIG. 7 is a partial longitudinal sectional view showing a clutch disc assembly according to the second embodiment of the invention.
Figure 8:
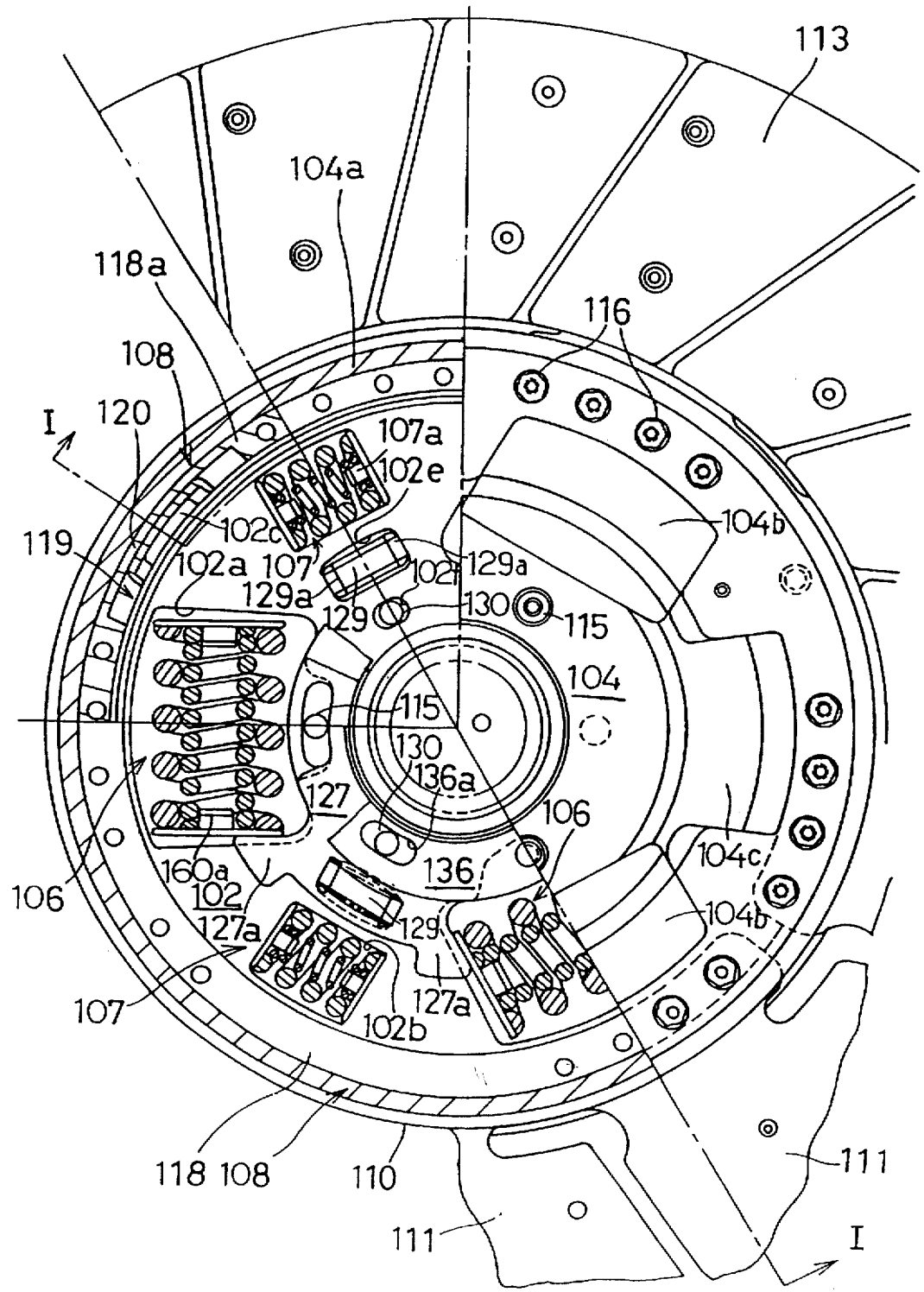
FIG. 8 is a partially fragmentary plan view showing the clutch disc assembly.

FIGS. 7 and 8 show a clutch disc assembly in accordance with the second embodiment of the present invention. The line 0—0 represents a rotary centerline of the clutch disc assembly.

In the figures, the clutch disc assembly is composed mainly of a hub 101 having a flange 102 on its outer circumference, a clutch plate 103 and a retaining plate 104 which are arranged on both sides of the flange 102 and rotatably mounted on the hub 101 from the lateral sides, first coil springs 106 and second coil springs 107 for elastically coupling both plates 103 and 104 with the flange 102 in the circumferential direction within a lubrication chamber 105 defined by both plates 103 and 104 and the hub 101, and a viscous damper mechanism 108 disposed within the lubrication chamber 105 for generating viscous resistance by utilizing the lubricant oil contained in the lubrication chamber 105 during the relative rotation of both the plates 103 and 104 to the flange 102. The hub 101 has, at its inner side, spline teeth 101a for engagement with spline portions on an outer circumference of the input shaft (output side member) of the transmission (not shown).

The lubrication chamber 105 is filled with fluid such as grease or lubricant oil. A bush 109 is used to center the clutch plate 103 and to seal an inner circumferential portion of the lubrication chamber 105. The retaining plate 104 has, on its outer circumferential portion, a cylindrical wall 104a extending toward the clutch plate 103 and in contact with the latter. An O-ring 110 is disposed between the clutch plate 103 and a flange portion of the cylindrical wall 104a to seal the outer circumferential portion of the lubrication chamber 105. Also, a plurality of cushioning plates 111 are fixed to the outer circumferential portion of the clutch plate 103 by rivets 112. Frictional facings 113 are fixed to both sides of the cushioning plates 111. When the friction facings 113 are depressed on, for example, an engine flywheel (input side rotary member not shown), the torque is input to the clutch disc assembly.

The clutch plate 103 and the retaining plate 104 are coupled with each other at the inner circumferential portion by first pins 115 and at the outer circumferential portion by second pins 116.

Three first window holes 102a and three second window holes 102b, smaller than the first window holes 102a in both the circumferential direction and radial direction, are formed alternatively in radially middle portions of the flange 102. The first pins 115 are inserted into an inner peripheral portion of the first window hole 102a. When the first pins 115 are brought into contact with edges of the first window holes 102a in the circumferential direction, the torsion between the clutch plate 103 and retaining plate 104 to the flange 102 (and the hub 101) is restricted. Large diameter double coil springs 106 and small diameter double coil springs 107 are disposed within the first window holes 102a and the second window holes 102b, respectively. It should be noted that each of the double coil springs 106 and 107 is formed by a large diameter coil spring and a small diameter coil spring inserted into the respective large diameter coil spring. A predetermined interval is provided between spring seats 106a located at both ends of each spring 106 and the first window hole 102a. Spring seats 107a provided at both ends of the second coil spring 107 are brought into contact with both ends of the second window hole 102b in the circumferential direction. Drawing portions 103b, 104b and 103c are formed at the portions of both the plates 103 and 104 corresponding to the first coil springs 106 and the second coil springs 107 for receiving them.

Figure 9:
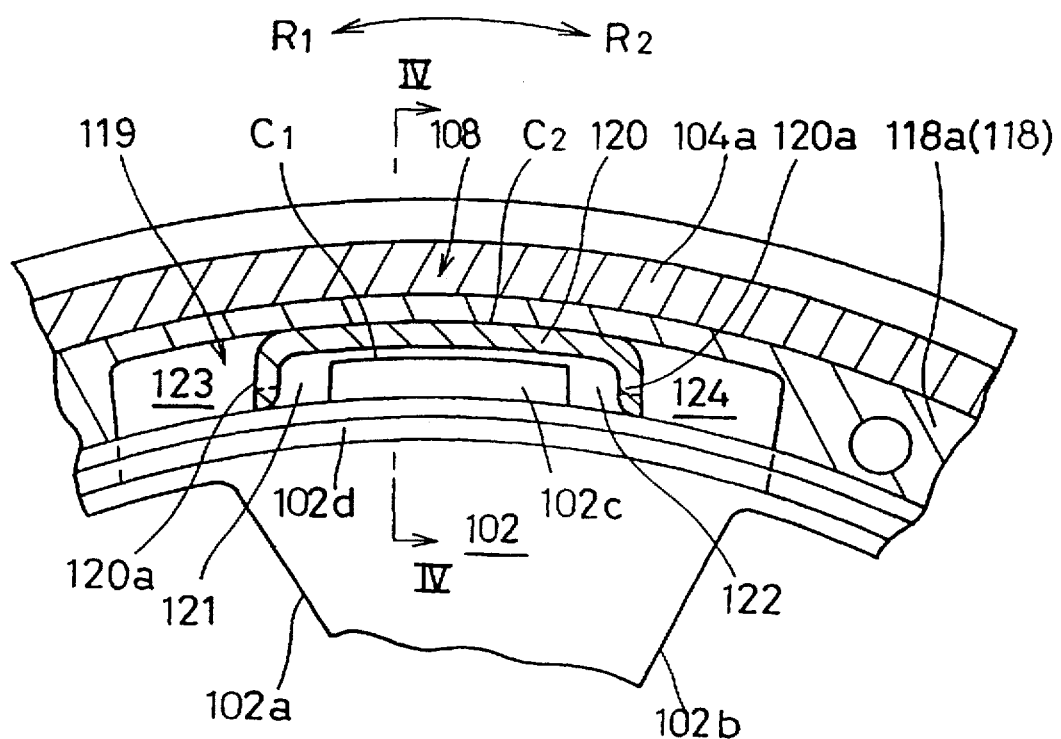
FIG. 9 is a partially enlarged view of FIG. 8.
Figure 10:
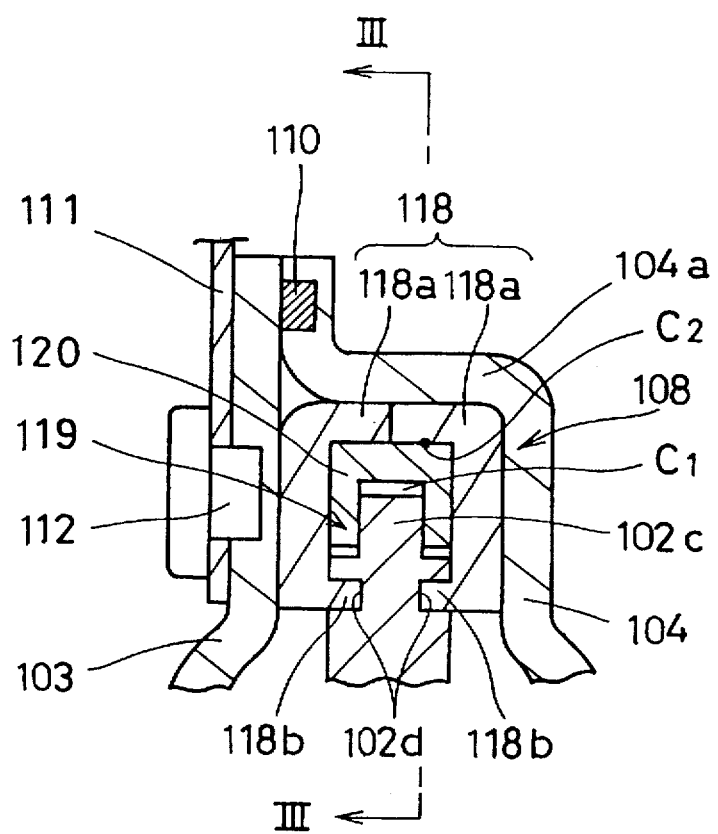
FIG. 10 is a partially enlarged view of FIG. 7.

The viscous damper mechanism 108 is disposed further radially outwardly of the coil springs 106 and 107. As shown in FIGS. 9 and 10, the viscous damper mechanism 108 is composed of an annular member 118 having a plurality of arcuate chambers 119 which have a long hole open radially inwardly and extending circumferentially, projections 102c projecting radially outward from outer edge of the flange 102 and inserted into the arcuate chambers 119 of the annular member 118 through the long hole, and cap-shaped sliders 120 disposed movably in the circumferential direction of the arcuate chamber 119.

The annular member 118 is composed of two halves 118a divided in the axial direction and is interposed on the inner circumferential side of the cylindrical wall 104a between the clutch plate 103 and the outer circumferential portion of the retaining plate 104. The second pins 116 (see FIG. 7) pass through the two halves 118a which form the annular member 118. Thus, the annular member 118 is rotated together with the clutch plate 103 and the retaining plate 104. As described above and as shown in FIG. 10, the parts corresponding to the arcuate chambers 119 of the annular members 118 are U-shaped with the long hole opening radially inwardly. The outer edge of the flange 102 is inserted into the long hole of the arcuate chamber 119, whereby the annular member 118 and the flange 102 can rotate relative to each other. The fluid filled in the chambers 119 is the same as the lubricant oil or grease used in the lubrication chamber 105. Engagement projections 118b each extending inwardly are formed on the inner circumferential edges of the two members 118a of the annular member 118 and the engagement projections 118b are engaged with annular grooves 102d provided on both sides of the outer circumferential portion of the flange 102 to thereby seal the inner circumferential portion of the arcuate chamber 119.

Shape of the outer circumferential wall of the slider 120 corresponds to shape of the wall of the arcuate chamber 119 so that the slider 120 can move smoothly in the arcuate chamber 119. The arcuate chamber 119 is divided into large chambers 123 and 124 by each slider 120. The large chambers 123 and 124 are in fluid communication with a small chamber 121 and a small chamber 122 through cutaway portions formed radially inwardly of both sides of stopper portions 120a, respectively.

The projection 102c of the flange 102 is inserted into the each slider 120 so that the interior of the slider 120 is divided into the small chambers 121 and 122. The small chambers 121 and 122 are in fluid communication with each other through a first choke $C_1$ between the projection 102c and the inner circumferential surface of the slider 120. The slider 120 has the stopper portions 120a keeping away from the projection 102c through a certain angle in the neutral position. The cutaway portion made in the stopper portion 120 is larger in size than the first choke $C_1$. When the slider 120 is moved in the circumferential direction and brought into contact with the projection 102c, the cutaway portion is closed. A second choke $C_2$ which is smaller than the first choke $C_1$ is kept between the outer circumferential wall of the slider and the inner circumferential wall of the arcuate chamber 119.

A first side plate 126 and a second side plate 127 are disposed on both sides of the flange 102 within the lubrication chamber 105. The first and second side plates 126 and 127 are coupled with the clutch plate 103 and the retaining plate 104 in an elastic manner in the circumferential direction through the first springs 106, and coupled with the flange 102 in an elastic manner in the circumferential direction through low rigidity coil springs 129. As shown in FIG. 8, abutment portions 127a to be brought into contact with the spring seats 106a of the first coil springs 106 are formed on the outer circumferential plate of the second side plate 127 (This is the case with respect to the first side plate 126 too).

Third window holes 102e are formed on an inner circumferential side of each second window holes 102b in the flange 102. The low rigidity coil spring 129 is disposed in the third window hole 102e. Spring seats 129a are provided at both ends of the coil spring 129. The spring seats 129a are extending in the axial direction and are brought into contact with both ends in the circumferential direction of each hole formed in the first and second side plates 126 and 127.

The first and second side plates 126 and 127 are coupled with each other by stopper pins 130 which are coupled with each other at the inner circumferential portion. The stopper pins 130 pass through fourth window holes 102f formed in the inner circumferential portion of the flange 102. A predetermined gap is kept in the circumferential direction between the stopper pins 130 and the fourth window holes 102f. When the stopper pins 130 are brought into contact with both ends in the circumferential direction of the fourth window holes 102f, the torsional motion is restricted between the first and second side plates 126 and 127 to the flange 102. A flange portion 109a of the bush 109 is arranged between the first side plate 126 and the flange 102. Disc plates 132, 133 and 134 are interposed between the flange 102 and the second side plate 127.

A first disc plate 135 is disposed between the inner circumferential portion of the clutch plate 103 and the first side plate 126, and a second disc plate 136 is disposed between the second side plate 127 and the retaining plate 104. A hole 136a (FIG. 8) extending in the circumferential direction is formed in the first disc plate 135 and the second disc plate 136 so that the stopper pins 130 are movable in the circumferential direction.

The operation of the clutch disc assembly and the characteristics of the operation will be described.

When the friction facings 113 are depressed against, for example, the engine flywheel, the torque of the engine side flywheel is input into the clutch plate 103 and the retaining plate 104. The torque is transmitted through the first coil springs 106, the second coil springs 107 and the low rigidity coil spring 129 to the flange 102 of the hub 101 and further to the shaft on the output side.

The change in torsional rigidity between the clutch plate 103 and the retaining plate 104 to the flange 102 will be explained.

Assume that the hub 101 is fixed to a base (not shown) and the clutch plate 103 and the retaining plate 104 are twisted to the flange 102(the hub 101). When the clutch plate 103 and the retaining plate 104 start torsional motion, the lowest rigidity coil springs 129 are compressed. When the stopper pins 130 are brought into contact with one of both ends in the circumferential direction of the fourth windows 102f of the flange 102, the relative rotation between the side plates 126 and 127 to the flange 102 is finished. When the compression of the first coil springs 106 is developed, then, the clutch plate 103 and the retaining plate 104 cause the second coil springs 107 to be compressed. Thereafter, it is possible to obtain the high rigidity characteristics. When the first pins 115 are brought into contact with one of both ends in the circumferential direction of the first window holes 102c of the flange 102, then, the relative movement of both the plates 103 and 104 to the flange 102 is finished.

In the foregoing torsional operation, the viscous resistance is generated mainly by the viscous damper mechanism 108 in addition to the slippage among the bush 109 and the disc plates 132 to 134 clamped that are between the side plates 126 and 127 and the flange 102 and also to the slippage between the first and second plates 135 and 136 clamped between the clutch plate 103 and the retaining plate 104 and the side plates 126 and 127.

In the foregoing torsional operation, assume that the clutch plate 103 and the retaining plate 104 are displaced in, for example, a rotational direction $R_1$ from the neutral point shown in FIG. 9. The annular member 118 and the sliders 120 are moved together in the rotational direction $R_1$. As a result, the small chambers 122 within the sliders 120 are compressed to be small in size, and at the same time, the small chambers 121 is expanded to be large in size. Then, the lubricant oil within the first small chambers 121 will flow into the small chambers 122 through chokes $C_1$ and also will flow through cutaway portions of the stoppers 120a on the $R_1$ side to the large chamber 124. Since the cross-sectional area of the flow path of the choke $C_1$, is large, the viscous resistance is small.

When the torsional angle is increased, and the stopper portions 120a on the $R_2$ side are brought into contact with the projections 102c, the flow of the lubricant oil is stopped between the inside of the sliders 120 and the projections 102c. Thus, the sliders 120 are held in a condition that the sliders 120 are fixed to the projections 102c. When the torsional motion is further continued, the annular member 118 is moved in the rotational direction $R_1$. The large chambers 124 are compressed to be small in size, whereas the large chambers 123 are expanded to be large in size. The lubricant oil contained within the large chambers 124 will then flow into the large chambers 123 through the choke $C_2$ between the inner circumferential wall of the annular member 118 and the outer circumferential wall of the sliders 120. At this time, the flow path area of the choke $C_2$ is small, the viscous resistance is large.

When the clutch plate 103 and the retaining plate 104 are returned after the clutch plate 103 and the retaining plate 104 have been twisted in the $R_1$ direction, first of all, the stoppers 120a on the $R_2$ side of the sliders 120 are separated from the projections 102c so that choke $C_1$ functions. For this reason, small viscous resistance is generated.

Assume that torsional vibration having a small angular displacement is transmitted to the viscous damper mechanism 108 due to, for example, combustion fluctuations of the engine under the condition that the clutch plate 103 and the retaining plate 104 are in the neutral position as shown in FIG. 9. In this case, the annular member 118 and the slider 120 reciprocally move relative to the flange 102 in a small-angle range, whereby the lubricant oil flows through the first choke C1. Therefore, small viscous resistance effectively dampens the torsional vibration having the small angular displacement.

Further assume that the torsional vibration having the small angular displacement is transmitted to the viscous damper mechanism 108 under the condition that the clutch plate 103 and the retaining plate 104 are twisted relative to the flange 102 through a certain angle. In this case, the annular member 118 and the sliders 120 reciprocally move relative to the flange 102 in small-angle range where the lubricant oil flows through the first choke $C_1$, so that it is possible to obtain small viscous resistance. Namely, the time when the viscous resistance is changed is not determined by the absolute twist angle of the clutch plate 103 and the retaining plate 104 relative to the flange 102, but by the positional relation between the sliders 120 and the projection 102c.

Assume that the low-frequency torsional vibration is input to the viscous damper mechanism 108 because the driver suddenly depresses or loosen the accelerator pedal. Since the low-frequency torsional vibration has a large angular displacement, the annular member 118 reciprocally moves relative to the flange 102 in a large angle range where the lubricant oil flows mainly through the second choke $C_2$, which generates large viscous resistance.

In this case, since the viscosity of fluid is utilized, it is possible to generate a larger viscous resistance in comparison with the frictional resistance by the conventional friction member. Accordingly, it is possible to effectively dampen the low-frequency torsional vibration.

As mentioned before, the viscous damper mechanism 108 can effectively dampen two different kinds of torsional vibrations by generating different magnitudes of the viscous resistance. Also, due to utilization of the viscosity, the change of the torsional rigidity may be smooth.

Also, since the viscous damper mechanism 108 is located most outwardly within the lubrication chamber 105, it is possible to generate a large hysteresis torque with a small resistance force to thereby make the damper mechanism 108 compact.

Since the first coil springs 106 and the second coil springs 107 are lubricated within the lubrication chamber 105, even if these springs 106 and 107 are repeatedly compressed and expanded, there is almost no fear that frictional wear or damage would be caused in the drawing portions 103b and 104b of the clutch plate 103 and the retaining plate 104. Thus, the service life of the clutch disc assembly is prolonged.

Various details of the invention may be changed without departing from its spirits nor its scope. Furthermore, the foregoing description of the embodiments according to the present invention is provided for the purpose of illustration only, and not for the purpose of limiting the invention as defined by the appended claims and their equivalents.

What is claimed is:

1. A clutch disc assembly comprising:

a hub having a flange on its outer circumference;

a disc-like plate rotatably mounted on said hub, said disc-like plate at least partially defining a fluid chamber which is filled with a fluid medium;

a friction member connected to said disc-like plate;

an elastic member located in said fluid chamber for elastically connecting said flange and said disc-like plate for a limited rotary displacement relative to each other;

a viscous damper mechanism disposed in said fluid chamber, having:

an annular member connected to said disc-like plate and disposed radially outwardly of said elastic member within said fluid chamber, said annular member defining a plurality of arcuate chambers, each of said arcuate chambers being sealed from adjacent ones of said arcuate chambers such that no fluid may flow between adjacent ones of said arcuate chambers;

a plurality of sliders, each of said sliders having opposing abutting portions, each one of said sliders being disposed in a corresponding one of said arcuate chambers and being displaceable in circumferential directions;

a plurality of stop members connected to said flange and each of said stop members extended into a corresponding one of said arcuate chambers and a corresponding one of said sliders, an inside portion of each of said sliders being divided by said stop members into two first chambers, and said sliders dividing said arcuate chambers into two second chambers;

a first choke formed between each corresponding one of said stop members and said sliders;

a second choke formed between an inner wall of each of said arcuate chambers and said sliders an amount of fluid flow through said second choke being smaller than that of said first choke; and said first choke being opened in response to a first-angle of relative rotary displacement between said disc-like plates and said flange so that said fluid medium flows through said first choke, generating a first viscous resistance, and said first choke portion being closed in response to a second-angle of relative rotary displacement between said disc-like plates and said flange which is larger than said first-angle so that said fluid medium flows through said second choke, generating a second viscous resistance higher than said first viscous resistance.

2. A clutch disc assembly according to claim 1, wherein said viscous damper mechanism is located radially outward of said flange, inner circumferential side of said arcuate chamber is formed with a hole extending circumferentially, outer edge of said flange being inserted into said arcuate chamber through said hole, said stop member being a protrusion extending radially outward from outer edge of said flange, outer circumference of said flange being formed with annular grooves on the lateral sides, and said annular member having sealing portions on the radially inner side which are inserted into said annular grooves.

3. A clutch disc assembly according to claim 2, wherein said slider is a cap-like member covering said protrusion protruding radially outward, said cap-like member having outer circumferential wall corresponding to a shape of an inner wall of said arcuate chamber, said abutting portions extending radially inward from ends of said outer circumferential wall, said abutting portion having a fluid path which is larger than said first choke portion and is closed when said abutting portion of said slider and said protrusion come into contact with each other, whereby said first choke portion is a gap between said protrusion and said outer circumferential wall of said cap-like member, and said second choke portion is a gap between said inner wall of said arcuate chamber and said outer circumferential wall of said cap-like member.

4. A clutch disc assembly according to claim 3, further comprising a sub plate in said fluid chamber, and said elastic member is composed of a first elastic member elastically connecting said disc-like plates and said sub plate in the circumferential direction and a second elastic member elastically connecting said sub plate and said hub in the circumferential direction, said second elastic member having smaller rigidity than said first elastic member.

5. A clutch disc assembly according to claim 4, wherein said first and second elastic members are coil springs extending circumferentially.

6. A clutch disc assembly comprising:

a hub having a flange on its outer circumference;

a disc-like plate rotatably mounted on said hub, said disc-like plate at least partially defining a fluid chamber which is filled with a fluid medium;

an elastic member located in said fluid chamber for elastically connecting said flange and said disc-like plate for a limited rotary displacement relative to each other;

a viscous damper mechanism disposed in said fluid chamber, having:

an annular member connected to said disc-like plate and disposed radially outwardly of said elastic member within said fluid chamber, said annular member defining a plurality of arcuate chambers, each of said arcuate chambers being sealed from adjacent ones of said arcuate chambers such that no fluid may flow between adjacent ones of said arcuate chambers;

a plurality of sliders each of said sliders having opposing abutting portions, each one of said sliders being disposed in a corresponding one of said arcuate chambers and being displaceable in circumferential directions;

a plurality of stop members connected to said flange and each of said stop members extended into a corresponding one of said arcuate chambers and a corresponding one of said sliders, an inside portion of each of said sliders being divided by said stop members into two first chambers, and said sliders dividing said arcuate chambers into two second chambers;

a first choke formed between each corresponding one of said stop members and said sliders;

a second choke formed between an inner wall of each of said arcuate chambers and said sliders, an amount of fluid flow through said second choke being smaller than that of said first choke; and said first choke being opened in response to a first-angle of relative rotary displacement between said disc-like plates and said flange so that said fluid medium flows through said first choke, generating a first viscous resistance, and said first choke portion being closed in response to a second-angle of relative rotary displacement between said disc-like plates and said flange which is larger than said first-angle so that said fluid medium flows through said second choke, generating a second viscous resistance higher than said first viscous resistance.

7. A damper disc assembly according to claim 6, wherein said viscous damper mechanism is located radially outward of said flange, inner circumferential side of said arcuate chamber is formed with a hole extending circumferentially, outer edge of said flange being inserted into said arcuate chamber through said hole, said stop member being a protrusion extending radially outward from outer edge of said flange, outer circumference of said flange being formed with annular grooves on the lateral sides, and said annular member having sealing portions on the radially inner side which are inserted into said annular grooves.

8. A damper disc assembly according to claim 7, wherein said slider is a cap-like member covering said protrusion protruding radially outward, said cap-like member having outer circumferential wall corresponding to a shape of an inner wall of said arcuate chamber, said abutting portions extending radially inward from ends of said outer circumferential wall, said abutting portion having a fluid path which is larger than said first choke portion and is closed when said abutting portion of said slider and said protrusion come into contact with each other, whereby said first choke portion is a gap between said protrusion and said outer circumferential wall of said cap-like member, and said second choke portion is a gap between said inner wall of said annular chamber and said outer circumferential wall of said cap-like member.

9. A damper disc assembly according to claim 8, further comprising a sub plate in said fluid chamber, and said elastic member is composed of a first elastic member elastically connecting said disc-like plates and said sub plate in the circumferential direction and a second elastic member elastically connecting said sub plate and said hub in the circumferential $C_1$ and also will flow through cutaway portions of the stoppers direction, said second elastic member having smaller rigidity than said first elastic member.

10. A damper disc assembly according to claim 7, wherein said first and second elastic members are coil springs extending circumferentially.

* * * * *